United States Patent
Manabe

(10) Patent No.: US 8,988,548 B2
(45) Date of Patent: Mar. 24, 2015

(54) IMAGE COMPOSITION APPARATUS AND STORAGE MEDIUM STORING A PROGRAM

(71) Applicant: Casio Computer Co., Ltd., Tokyo (JP)

(72) Inventor: Yoshitsugu Manabe, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 191 days.

(21) Appl. No.: 13/670,717

(22) Filed: Nov. 7, 2012

(65) Prior Publication Data

US 2013/0120607 A1     May 16, 2013

(30) Foreign Application Priority Data

Nov. 11, 2011   (JP) ................................ 2011-247704

(51) Int. Cl.

| | |
|---|---|
| *H04N 9/73* | (2006.01) |
| *G06T 5/00* | (2006.01) |
| *H04N 5/235* | (2006.01) |
| *H04N 9/64* | (2006.01) |
| *H04N 9/76* | (2006.01) |
| *G06T 5/50* | (2006.01) |
| *H04N 9/04* | (2006.01) |

(52) U.S. Cl.
CPC .............. *G06T 5/009* (2013.01); *H04N 5/2355* (2013.01); *H04N 9/643* (2013.01); *H04N 9/76* (2013.01); *G06T 5/50* (2013.01); *H04N 9/045* (2013.01); *G06T 2207/20208* (2013.01)
USPC ....................... 348/223.1; 348/242; 348/222.1

(58) Field of Classification Search
None
See application file for complete search history.

(56) References Cited

U.S. PATENT DOCUMENTS

| | | | |
|---|---|---|---|
| 2004/0136603 A1* | 7/2004 | Vitsnudel et al. .............. | 382/254 |
| 2006/0262363 A1* | 11/2006 | Henley .......................... | 358/516 |
| 2007/0206246 A1* | 9/2007 | Tsuruoka et al. .............. | 358/521 |
| 2010/0110180 A1* | 5/2010 | Tonogai et al. ................ | 348/136 |
| 2010/0150473 A1* | 6/2010 | Kwon et al. ................... | 382/284 |
| 2010/0157078 A1* | 6/2010 | Atanassov et al. ........... | 348/222.1 |
| 2013/0201206 A1* | 8/2013 | Bryant et al. ................. | 345/600 |

FOREIGN PATENT DOCUMENTS

| | | | |
|---|---|---|---|
| JP | 2001-268345 A | | 9/2001 |
| JP | 2003-046848 | | 2/2003 |
| JP | 2006-345509 A | | 12/2006 |
| JP | 2008-099018 A | | 4/2008 |

OTHER PUBLICATIONS

Japanese Office Action dated Mar. 5, 2013 (and English translation thereof) in counterpart Japanese Application No. 2011-247704.

* cited by examiner

*Primary Examiner* — Twyler Haskins
*Assistant Examiner* — Wesley J Chiu
(74) *Attorney, Agent, or Firm* — Holtz, Holtz, Goodman & Chick PC

(57) ABSTRACT

An image composition apparatus 1 is provided with an information acquisition section 53, an image adjustment section 54 and a synthesis section 56. The information acquisition section 53 acquires numerical values relating to brightness of image regions with a particular hue in corrected exposure image data among plural sets of image data that are sequentially captured with the exposure duration being varied. The synthesis section 56 performs pixel addition of the plural sets of image data by changing a degree of addition of the plural sets of image data, based on the numerical values thus acquired, and generates composite image data with a widened dynamic range.

8 Claims, 8 Drawing Sheets ically, for some other purpose but an image
IMAGE COMPOSITION APPARATUS AND STORAGE MEDIUM STORING A PROGRAM This application is based on and claims the benefit of priority from Japanese Patent Application No. 2011-247704, filed on 11 Nov. 2011, the content of which is incorporated herein by reference.

BACKGROUND OF THE INVENTION

1. Field of the Invention

The present invention relates to an image composition apparatus with which a dynamic range of an image may be corrected, and to a storage medium storing a program.

2. Related Art

In recent years, with a view to improving quality in relation to the viewing of images obtained by imaging and the like, various kinds of image processing are being applied to the data of images.

High dynamic range composition is known as one kind of this image processing (see Japanese Unexamined Patent Publication No. 2006-345509). The meaning of the term "high dynamic range composition" as used herein includes image processing that, by pixel addition synthesis of data of plural images of substantially the same scene with respectively different exposure values, generates image data that realizes a wide dynamic range.

Hereinafter, where no particular description is given, an image to which this composition processing has been applied is referred to as a "high dynamic range composite image" or an "HDR composite image".

However, the objective of the above-mentioned composition processing is to enhance reproduction of the scene at the time of image capture. Therefore, if a parameter of a color space is greatly adjusted for some other purpose but an image that is not lacking a realistic appearance is still desired, further rendering processing must be executed while maintaining the original hues of the captured image.

SUMMARY OF THE INVENTION

The present invention has been made in consideration of this situation, and an object of the present invention is to generate an image based on captured images that does not lose the appearance of hues in the originally captured images even if a parameter of a color space is greatly adjusted.

In order to achieve the object described above, an aspect of an image composition apparatus of the present invention includes:

An image composition apparatus comprising:

an information acquisition unit that acquires numerical values relating to brightness of pixel regions with a particular color in data of any image among data of a plurality of images that are sequentially captured with an exposure duration being varied; and a synthesis unit that performs pixel addition of the data of the plurality of images by changing a degree of addition of the data of the plurality of images, based on the numerical values acquired by the information acquisition unit, and generates data of a composite image whose dynamic range is widened.

In order to achieve the object described above, another aspect of an image composition apparatus of the present invention includes:

A non-transitory computer readable storage medium having stored therein a program executable by a computer that controls an image composition apparatus that generates composite image data, causing the computer to execute image composition processing comprising:

an information acquisition function that acquires numerical values relating to brightness of pixel regions with a particular color in data of any image among data of a plurality of images that are sequentially captured with an exposure duration being varied; and a synthesis function that performs pixel addition of the data of the plurality of images by changing a degree of addition of the data of the plurality of images, based on the numerical values acquired by the information acquisition function, and generates data of a composite image whose dynamic range is widened.

In order to achieve the object described above, still another aspect of an image composition apparatus of the present invention includes:

An image composition method comprising:

an information acquisition step of acquiring numerical values relating to brightness of pixel regions with a particular color in data of any image among data of a plurality of images that are sequentially captured by an image capturing unit with an exposure duration being varied; and a synthesis step of performing pixel addition of the data of the plurality of images by changing a degree of addition of the data of the plurality of images, based on the numerical values acquired in the information acquisition step, and generating data of a composite image whose dynamic range is widened.

According to the present invention, on the basis of captured images, a parameter of a color space may be greatly adjusted and an image may be generated without losing a realistic appearance.

DETAILED DESCRIPTION OF THE INVENTION

In the following, an embodiment of the present invention will be explained with reference to the drawings.

Figure 1:
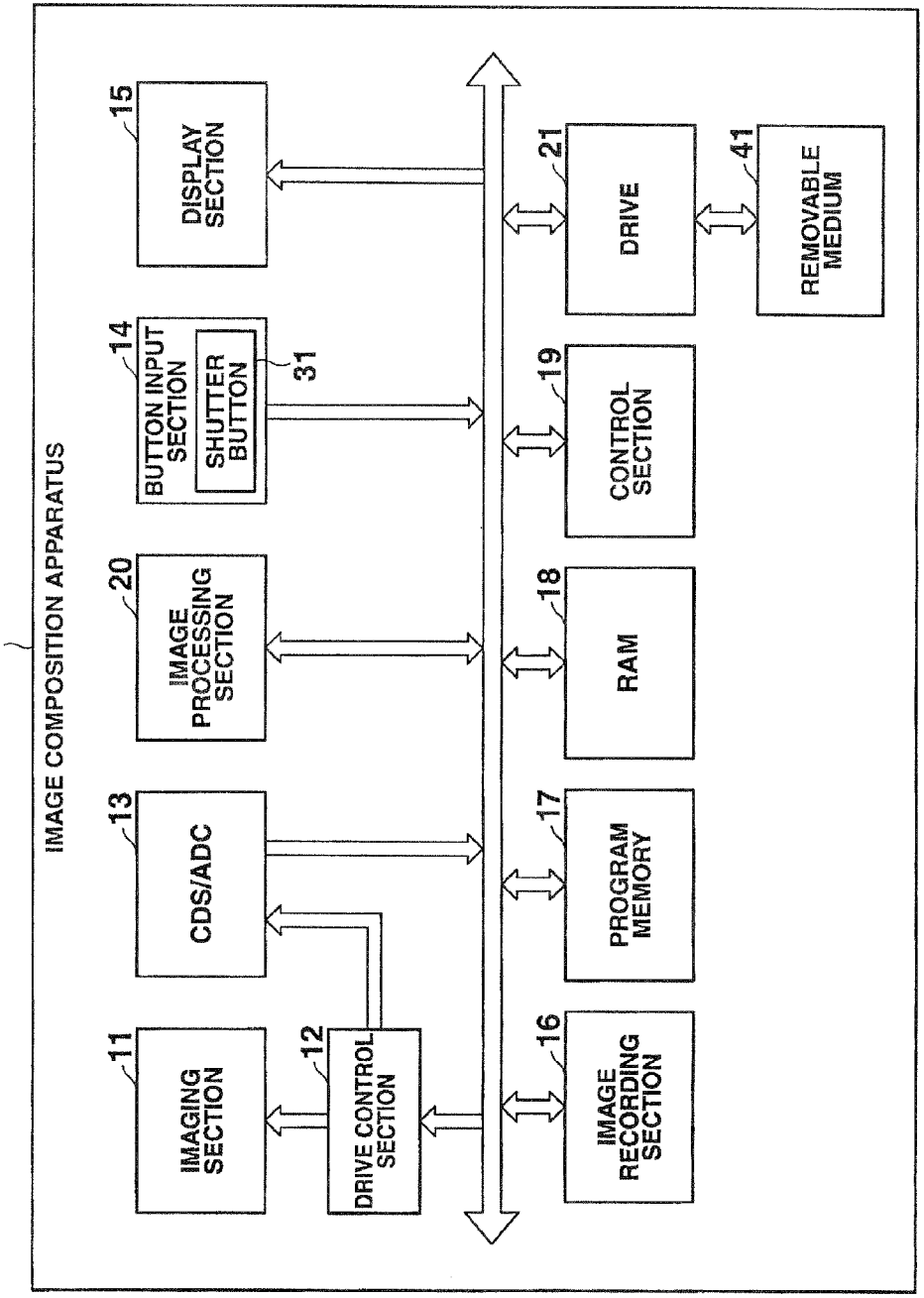
FIG. 1 is a circuit structure diagram of an imaging apparatus in accordance with an embodiment of the present invention.

FIG. 1 is a block diagram showing hardware structure of an embodiment of the image composition apparatus of the present invention.

An image composition apparatus 1 is configured as an imaging device. To be specific, the image composition apparatus 1 is equipped with an imaging section 11, a drive control section 12, a correlated double sampling circuit (CDS)/analog-to-digital converter (ADC) 13, a button input section 14, a display section 15, an image recording section 16, a program memory 17, a RAM 18, a control section 19, an image processing section 20 and a drive 21. These are connected together by a bus line.

The button input section 14 is equipped with a shutter button 31 for detecting a recording instruction from a photographer.

The imaging section 11 incorporates an image sensor of a CMOS (complementary metal oxide semiconductor) type or the like, an RGB color filter disposed over the image sensor, and a driver. In accordance with control by the drive control section 12, which is described below, the driver retains strengths of light for predetermined durations in the form of accumulations of electronic charges, converts the charges to analog signals, and outputs the analog signals to the CDS/ADC 13.

The imaging section 11 detects an imaging instruction from a photographer via the shutter button 31, the control section 19 and the drive control section 12, alters exposure conditions (shutter speed and aperture value), and outputs analog signals (hereinafter referred to as image capture signals) of a plural number of images (color images), including an under-exposure, a correct-exposure and an over-exposure, to the CDS/ADC 13.

The CDS/ADC 13 includes the CDS, an automatic gain control amplifier (AGC) and the A/D converter (ADC).

When image capture signals are outputted from the imaging section 11 and inputted to the CDS/ADC 13, the CDS retains the image capture signals, the gain control amplifier amplifies the image capture signals, and the ADC converts the amplified image capture signals to digital signals (hereinafter referred to as captured image data) and outputs the digital signals.

Control relating to adjustment of the gain control amplifier is implemented on the basis of instructions from the drive control section 12. Thus, even if data of a plural number of captured images with the same exposure conditions (shutter speed and aperture value) is obtained, data of captured images with plural different conditions can be generated by successively altering the gain control amplifier for R, G and B, hues of the images and the like.

In addition to the aforementioned shutter button 31, the button input section 14 is equipped with various buttons for switching between imaging modes, for purposes of acquiring and storing data of captured images and the like, and for switching of displays and the like.

The display section 15 displays a captured image that has been subjected to image composition processing by the image processing section 20, which is described below.

The image recording section 16 records captured image data that has been subjected to image composition processing by the below-described image processing section 20, and that has been compressed and encoded into JPEG (Joint Photographic Experts Group) format, in the form of an image file.

The program memory 17 stores programs to be executed at the control section 19, the image processing section 20 and the like. The programs are read out from the program memory 17 by the control section 19 as required.

The RAM 18 temporarily retains data that is generated by various processes during the processing. The control section 19 controls overall operations for the processing of captured images.

The image processing section 20 executes various kinds of image processing such as compression and encoding/decompression and decoding to/from the JPEG format, image composition processing relating to the present invention and the like.

A removable medium 41 constituted by a magnetic disk, an optical disk, a magneto-optical disk, a semiconductor memory or the like is installed in the drive 21 as appropriate.

A program that is read from the removable medium 41 by the drive 21 is installed in the program memory 17 as required.

Similarly to the image recording section 16, the removable medium 41 may also store the various kinds of data such as captured image data and the like that are recorded in the image recording section 16. That is, the removable medium 41 functions as an image provision medium that memorizes data of new images for provision to the image recording section 16 that is an embedded memory.

Figure 2:
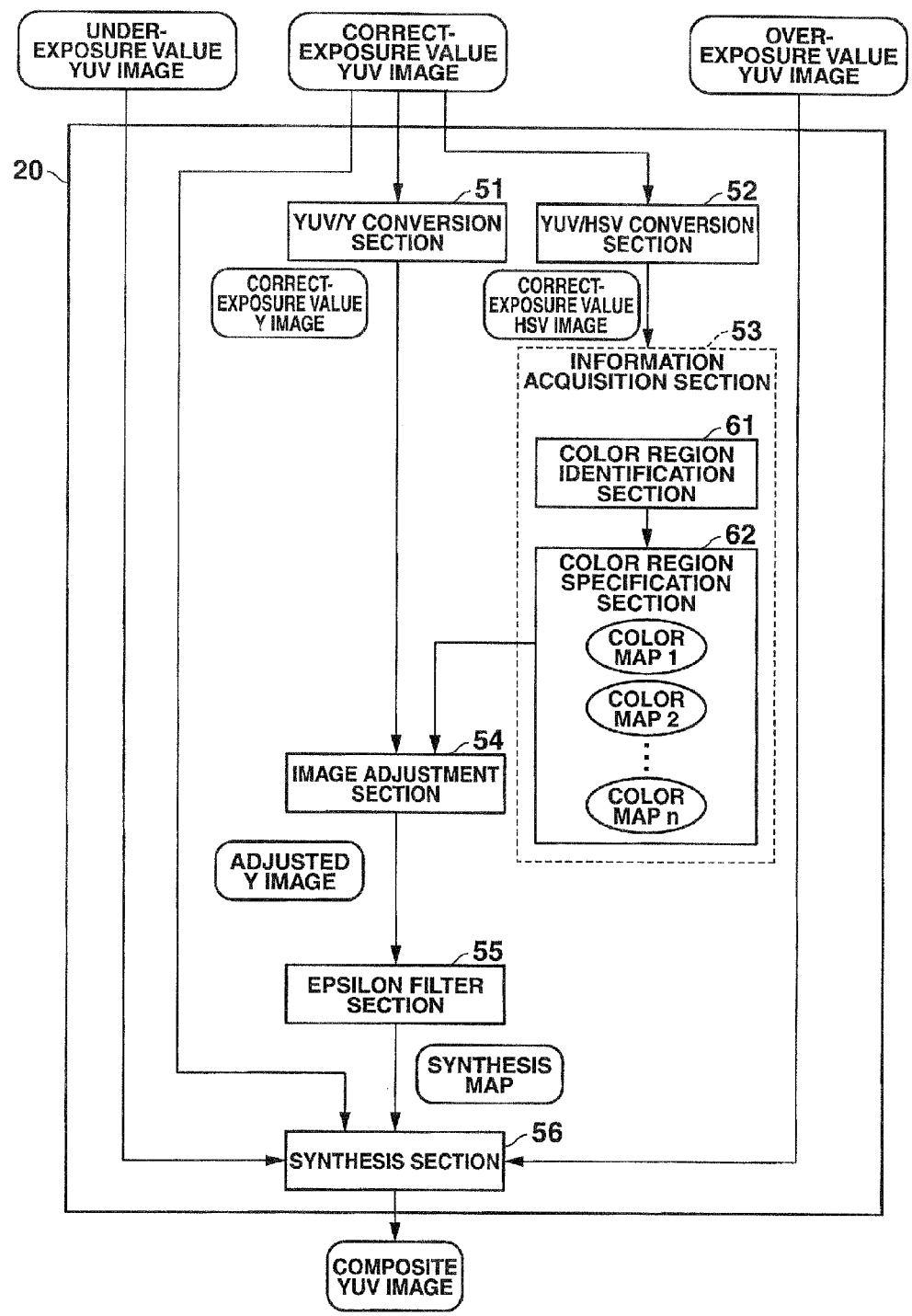
FIG. 2 is a functional block diagram illustrating, of functional structure of the image composition apparatus of FIG. 1, a functional structure for implementing image composition processing.

Next, functions for executing the image composition processing are described using the functional block diagram in FIG. 2.

FIG. 2 is a functional block diagram illustrating, of functional structure of the image composition apparatus of FIG. 1, a functional structure for implementing image composition processing.

The meaning of the term "image composition processing" as referred to in the present embodiment includes processing that generates data of a composite YUV image by synthesizing data of plural captured images with respectively different exposures.

Specifically, in the image composition processing, data of plural captured images that are acquired by successive imaging with an exposure condition being altered (the shutter speed, the aperture value, or the gain control value) is separated into luminance signals (Y) representing a luminance component defined in the YUV color space, and other components, specifically, of color difference components, a blue color difference component (Cb: B-Y, referred to hereinafter simply as U) and a red color difference component (Cr: R-Y, referred to hereinafter simply as V)–and the data is synthesized by pixel addition. As a result, an excellent effect may be realized in that composite YUV image data is obtained such that a sense of realism is not lost even when a parameter of the color space is greatly adjusted.

In particular, in the image composition processing, rather than synthesis by pixel addition so as to simply uniformly enhance the contrast, saturation or the like of the whole image, pixel addition synthesis is performed with ratios being varied at the pixel unit level, using luminance values that are adaptively adjusted in pixel units for regions with particular colors that are included in plants and other organisms belonging to the natural world. As a result, the effect mentioned above is more remarkable, and even if a parameter of the color space is even more greatly adjusted, captured image data with a natural appearance is provided.

When the image composition processing is executed, as shown in FIG. 2, the image processing section 20 of the image composition apparatus 1 functions as a YUV/Y conversion section 51, a YUV/HSV conversion section 52, an information acquisition section 53, an image adjustment section 54, an epsilon filter section 55, and a synthesis section 56.

Note that FIG. 2 is an example. At least a portion of the functions of the image processing section 20 may be assigned to the control section 19 and, conversely, at least a portion of the functions of the control section 19 may be assigned to the image processing section 20.

In the present embodiment, as the data of plural captured images with respectively different exposure conditions, as illustrated in FIG. 2, data of each of an image with a correct-exposure value (hereinafter referred to as the "correct-exposure value image"), an image with an exposure value exceeding the correct-exposure value (hereinafter referred to as the "over-exposure value image"), and an image with an exposure value below the correct-exposure value (hereinafter referred to as the "under-exposure value image") are inputted to the image processing section 20.

The meaning of the term "correct-exposure value" as used here is not necessarily an exposure value that is appropriate as a condition at the time of imaging, and includes an intermediate exposure value between two exposure values that are used when respectively imaging an under-exposure value image and an over-exposure value image.

The common source of the respective data of the correct-exposure value image, the over-exposure value image and the under-exposure value image is the imaging section 11 and CDS/ADC 13 in the present embodiment, but this is not a specific limitation. The source may be the removable medium 41, or may be another device not illustrated in FIG. 1 provided the image composition apparatus 1 includes functionality for communicating with the other device.

From the three components defined in the YUV color space–the luminance signals (Y) representing the luminance component, and the other components, specifically the blue component difference signals (U) and the red component difference signals (V)–the YUV/Y conversion section 51 separates and outputs only the Y component from the data of the correct-exposure value image of the present embodiment.

Thus, just the Y component is separated from the data of the correct-exposure value image by the YUV/Y conversion section 51. The data outputted from the YUV/Y conversion section 51 is hereinafter referred to as the "correct exposure value Y image data". The correct-exposure value Y image data is provided to the image adjustment section 54.

That is, the YUV/Y conversion section 51 extracts just information relating to luminance values from the correct-exposure value YUV image data to serve as the correct-exposure value Y image data, and provides this information to the image adjustment section 54.

The YUV/HSV conversion section 52 converts the format of the correct-exposure value image data of the present embodiment from image data defined in the YUV color space (YUV image data) to image data defined in the HSV color space (HSV image data), and outputs the HSV image data. Thus, correct-exposure value image data is outputted from the YUV/HSV conversion section 52 in the form of HSV image data, and is hereinafter referred to as the "correct-exposure value HSV image data".

Specifically, from the correct-exposure value image data in the YUV image data format, the YUV/HSV conversion section 52 extracts three components-hue (H), saturation/chroma (S) and value/brightness/lightness (V)-and outputs the three components to serve as the correct-exposure value HSV image data.

The correct-exposure value HSV image data is provided to the information acquisition section 53.

The information acquisition section 53 acquires numerical values relating to the brightness of pixel regions with particular colors that are contained in the correct-exposure value HSV image data outputted from the YUV/HSV conversion section 52. In the present embodiment, the color of the leaves of trees in the natural world, which is to say green, is applied as a particular color that should retain the original hue appearance from the captured image.

When the numerical values relating to the brightness of pixel regions with a particular color included in the correct-exposure value HSV image data are acquired, as shown in FIG. 2, the information acquisition section 53 of the image composition apparatus 1 functions as a color region identification section 61 and a color region specification section 62.

The color region identification section 61 calculates respective color levels for pixel units from the correct-exposure value HSV image data outputted from the YUV/HSV conversion section 52. The color region identification section 61 identifies color regions corresponding to a color on the basis of the color levels calculated for the respective pixel units. The color region identification section 61 provides information on the identified color regions to the color region specification section 62.

On the basis of the color regions identified by the color region identification section 61, the color region specification section 62 creates plural color maps n formed of the pixel values of the respective identified colors (n represents integers from 1 upward).

Herebelow, details of the creation of the color maps by the color region specification section 62 is described with reference to FIG. 3 and FIG. 4.

Figure 3:
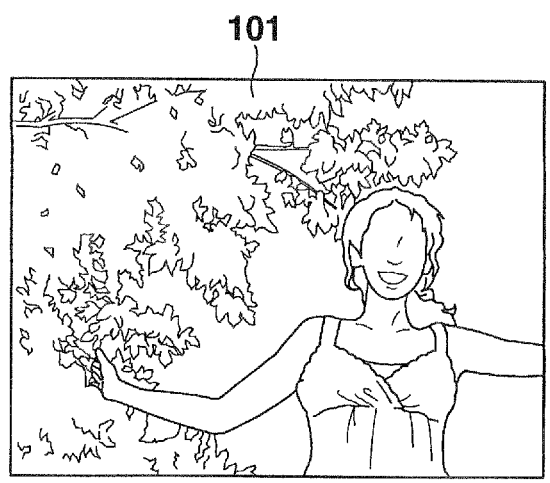
FIG. 3 is a view showing a corrected exposure HSV image converted by a YUV/HSV conversion section of the image composition apparatus of FIG. 2.

FIG. 3 is a view showing an example of a correct-exposure HSV image that has been converted by the YUV/HSV conversion section 52.

Figure 4:
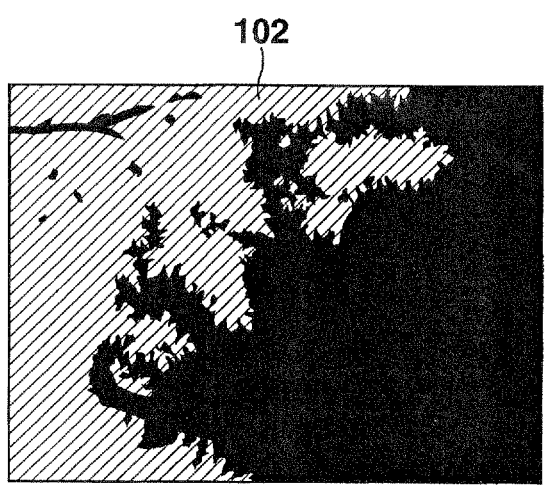
FIG. 4 is a diagram showing, from color maps created by a color region specification section of the image composition apparatus of FIG. 2, a color map (green) representing color regions corresponding to green.

FIG. 4 is a view showing an example of a color map (green) representing color regions corresponding to green from among the color maps created by the color region specification section 62.

From the correct-exposure HSV image data outputted from the YUV/HSV conversion section 52, the color region specification section 62 extracts three components for the particular color at the respective pixels: color levels relating to hue (H), color levels relating to saturation (S) and color levels relating to brightness (V). The color region specification section 62 calculates a final color level of a pixel on the basis of the following expression (1).

$$\text{Final color level} = (\text{color level}(H) \times \text{color level}(S) \times \text{color level}(V))/(255 \times 255) \quad (1)$$

In the present embodiment, the color region specification section 62 extracts the three components of color levels relating to hue (H), color levels relating to saturation (S) and color levels relating to brightness (V) of the respective pixels for the color green, and the color region specification section 62 calculates final color (green) levels for green for the respective pixels on the basis of expression (1). Then, the color region specification section 62 creates color regions corresponding to the color green on the basis of the final color levels of green calculated for the pixels.

In FIG. 4, a region 102 of pixels corresponding to green leaves 101 in FIG. 3 is shown as a color region corresponding to green.

The image adjustment section 54, which is described below, may acquire luminance values of the colors by analysing the plural color maps n created by the color region specification section 62. The color region specification section 62 provides information on the plural color maps n created for the respective colors to the image adjustment section 54.

The image adjustment section 54 in FIG. 2 adjusts luminance values for a particular color by adding or subtracting a pre-specified value to/from the luminance values corresponding to the particular color on the basis of the information of the plural color maps n created by the color region specification section 62 of the information acquisition section 53, this processing being applied to the correct-exposure Y image data. The correct-exposure Y image data in which the luminance values have been adjusted for a particular color by the image adjustment section 54 in this manner is hereinafter referred to as the "adjusted Y image data".

For example, for green, if excessive brightening of the color is to be suppressed in order to retain the appearance of hues from the originally captured image after image treatment processing, which is described below, the image adjustment section 54 may perform an adjustment such that the corresponding color region portions in the correct-exposure value Y image are darker, and thus lower a synthesis ratio of a bright exposure image, which is to say the over-exposure value YUV image.

Specifically, the image adjustment section 54 adjusts the corresponding color region portions by incrementing the pixel values in the color map corresponding to green in the data (pixel values representing luminances) of the green color region portions of the correct-exposure value Y image data.

Even more specifically, the image adjustment section 54 decrements the data (pixel values representing luminances) of the green color region portions in the correct-exposure value Y image data so as to lower the data by one step. Thus, in the adjusted Y image data provided by the image adjustment section 54, green regions are slightly darker than in the correct-exposure value Y image data.

On the other hand, if excessive darkening of the color is to be suppressed in order to retain the appearance of hues from the originally captured image after the below-described image treatment processing, the image adjustment section 54 may perform an adjustment such that the corresponding color region portions in the correct-exposure value Y image are brighter, and thus lower the synthesis ratio of a dark exposure image, which is to say the under-exposure value YUV image.

Specifically, the image adjustment section 54 adjusts the corresponding color region portions by decrementing pixel values in the color map corresponding to the color whose darkening is to be suppressed in the data (pixel values representing luminances) of the color region portions of the color whose darkening is to be suppressed in the correct-exposure value Y image data.

Even more specifically, the image adjustment section 54 increments the data (pixel values representing luminances) of the color region portions of the color whose darkening is to be suppressed in the correct-exposure value Y image data so as to raise the data by one step. Thus, in the adjusted Y image data provided by the image adjustment section 54, regions of the color whose darkening is to be suppressed are slightly brighter than in the correct-exposure value Y image data. The image adjustment section 54 provides the adjusted Y image data to the epsilon filter section 55. The image adjustment section 54 corresponds to the adjustment section of the present invention.

The epsilon filter section 55 generates image data that is equalized by the application of an epsilon filter to the adjusted Y image data provided from the image adjustment section 54, and provides the generated image data to the synthesis section 56. The image data outputted from the epsilon filter section 55, that is, the image data obtained by applying the epsilon filter to the adjusted Y image data, is used as data for image treatment processing, as described below. Hereinafter, this data is referred to as a "synthesis map".

On the basis of the synthesis map outputted from the epsilon filter section 55, the synthesis section 56 generates composite YUV image data by pixel addition synthesis of the respective data of the correct-exposure value YUV image, the over-exposure YUV image and the under-exposure value YUV image.

The type of synthesis processing executed by the synthesis section 56 is not particularly limited. However, employing synthesis processing that reinforces a dynamic range widening effect is better than conventional synthesis processing for generating data of an HDR composite image.

A technique for reinforcing this effect is not particularly limited. For example, techniques such as increasing the differences of the under-exposure value and the over-exposure value at the time of imaging (the bracketing range), increasing the number of images for composition, changing the gain parameters of the hues, and the like may be employed.

In the present embodiment, the synthesis section 56 executes the following sequence of processing as the synthesis processing.

In the present embodiment, respective data of the synthesis map, the correct-exposure value YUV image, the over-exposure value YUV image and the under-exposure value YUV image are respectively separately inputted to the synthesis section 56.

The synthesis section 56 generates data of a composite image by pixel addition synthesis of the respective data of the correct-exposure value YUV image, the over-exposure value YUV image and the under-exposure value YUV image in accordance with the synthesis map in which the luminance values are adjusted for a particular color. The composite image data generated in this manner is hereinafter referred to as the "HDR composite YUV image data", and the sequence of processing that generates the HDR composite YUV image data is hereinafter referred to as the "YUV component synthesis processing". The composite YUV image data generated by this YUV component synthesis processing has YUV components that have a wide dynamic range without whiteouts and blackouts or the like.

In the YUV component synthesis processing of the present embodiment, the respective data of the correct-exposure value YUV image, over-exposure value YUV image and under-exposure value YUV image are synthesized by pixel addition in accordance with predetermined synthesis ratios based on the synthesis map.

The meaning of the term "synthesis ratios based on the synthesis map" as used herein includes blending proportions of the data of the respective images when data of two or more images is synthesized by pixel addition.

For example, for a region that is bright in the synthesis map, the synthesis ratio of the under-exposure value YUV image is increased. Specifically, for a region that is bright in the synthesis map, the synthesis ratios of the correct-exposure value YUV image data, over-exposure value YUV image data and under-exposure value YUV image data are 70%, 0% and 30%, respectively. The data that is obtained as a result of blending 70% of the correct-exposure value YUV image data with 30% of the under-exposure value YUV image data becomes data of the composite YUV image.

When the over-exposure value YUV image data is not used for synthesis, its blending ratio is set to 0%.

On the other hand, for a region that is dark in the synthesis map, the synthesis ratio of the over-exposure value YUV image is increased. Specifically, for a region that is dark in the synthesis map, the synthesis ratios of the correct-exposure value YUV image data, over-exposure value YUV image data and under-exposure value YUV image data are 70%, 30% and 0%, respectively. The data that is obtained as a result of blending 70% of the correct-exposure value YUV image data and 30% of the over-exposure value YUV image data becomes data of the composite YUV image.

When the over-exposure value YUV image data is not used for synthesis, its blending ratio is set to 0%.

Thus, HDR composite YUV image data in which the luminances (contrasts) are adjusted for a particular color can be obtained. Therefore, the HDR composite image data in which the images are combined has a wider dynamic range and fewer whiteouts and blackouts than in the related art, and is data of an image in which saturation is appropriately adjusted. Moreover, even if a parameter of the color space is greatly adjusted, an image with a natural appearance may be produced.

The composite YUV image data generated in this manner is outputted from the synthesis section 56.

The image processing section 20 applies both contrast enhancement processing and saturation enhancement processing to the composite YUV image data outputted from the synthesis section 56.

As the contrast enhancement processing, although not shown in the drawings, the image processing section 20 locally enhances contrasts by applying respective unsharp masking processes in two frequency regions (for example, a low range and a medium range) to the composite YUV image data.

When the unsharp masking processes with the two frequency regions (in the example, a low range and a medium range) are each applied, the composite YUV image data is smoothed.

A filter used for this smoothing is not particularly limited. A usual low pass filter (LPF) may be employed. However, it is excellent to employ an edge preservation-type epsilon filter, bilateral filter or the like. This is because undershooting and overshooting that occur when contrast components are locally enhanced may thus be reduced.

As the saturation enhancement processing, the image processing section 20 applies processing to the composite YUV image data that enhances saturations using predetermined gains (hereinafter referred to as the "UV gain") as enhancement amounts.

Processes for enhancing saturation in this case are broadly divided into two categories, overall enhancement processing and partial enhancement processing.

The meaning of the term "overall enhancement processing" as used herein includes processing that enhances saturation such that the image gives a more lively overall impression.

The meaning of the term "partial enhancement processing" as used herein includes processing that enhances saturation using enhancement amounts associated with enhancement amounts for Y component enhancement processing.

Hereinafter, an enhancement amount for contrast enhancement processing is referred to as the "contrast enhancement amount", while an enhancement amount for saturation enhancement processing is referred to as the "saturation enhancement amount". The saturation enhancement amounts are further broadly divided into an enhancement amount used for overall enhancement processing and enhancement amounts used for partial enhancement processing. The former is hereinafter referred to as the "overall saturation enhancement amount" and the latter are referred to hereinafter as the "partial saturation enhancement amount".

Herein, the contrast enhancement amount and the partial saturation enhancement amount are associated. As a result, the color reproduction of contrast-enhanced portions is improved, and an image producing a sense of depth may be provided.

Next, the image composition processing executed by the image composition apparatus of FIG. 2 with this functional structure is described with reference to the flowchart of FIG. 5.

Figure 5:
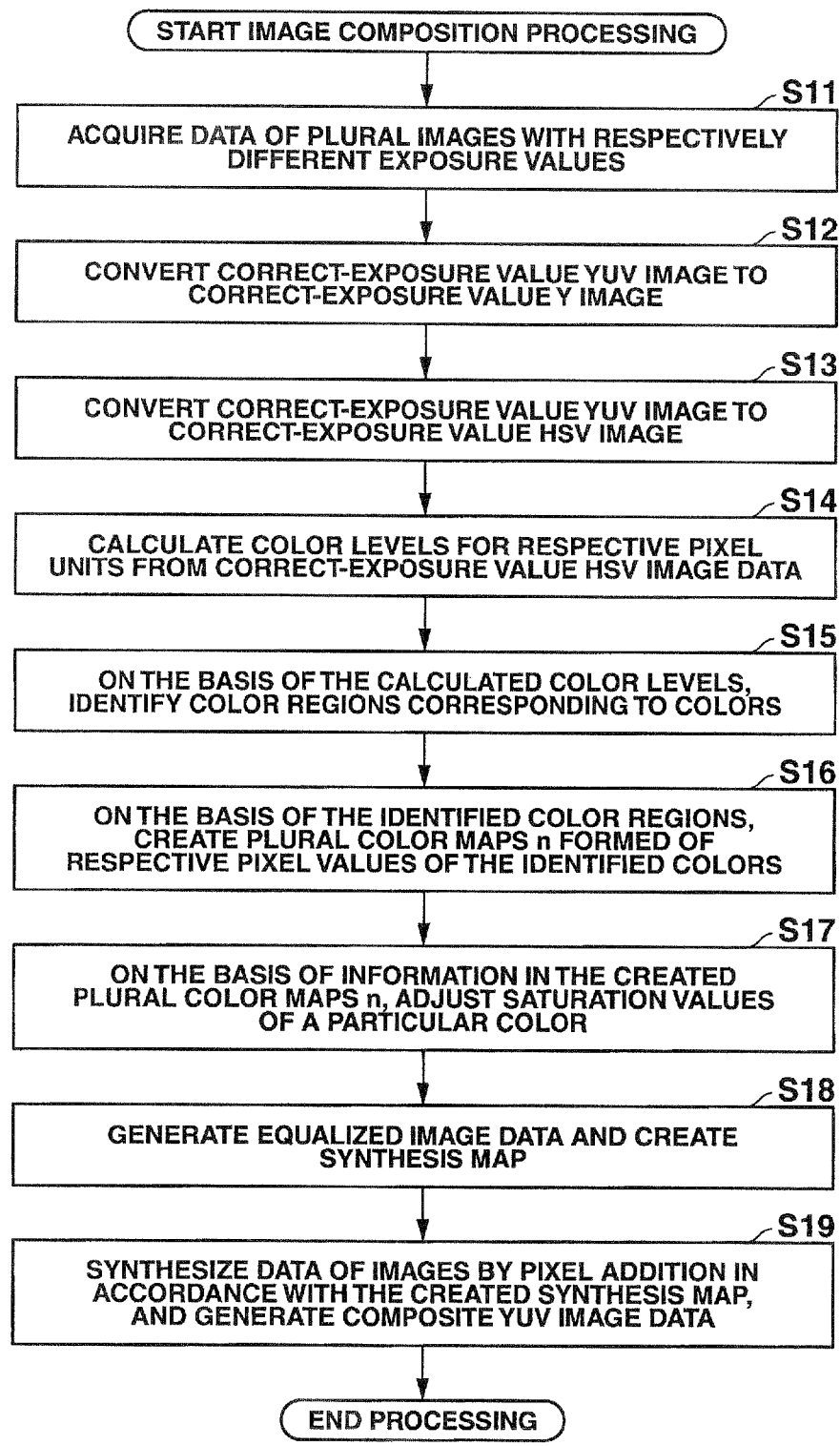
FIG. 5 is a flowchart showing an example of flow of image composition processing that is executed by an image processing section of the image composition apparatus of FIG. 2.

FIG. 5 is a flowchart showing an example of flow of the image composition processing.

In step S11, the image processing section 20 acquires data of plural images with respectively different exposure values. Specifically, the image processing section 20 acquires data of a correct-exposure value image, an over-exposure value image and an under-exposure value image.

In step S12, the YUV/Y conversion section 51 converts the correct-exposure value YUV image acquired by the image processing section 20 to a correct-exposure value Y image. Specifically, the YUV/Y conversion section 51 separates just the Y component from the data of the correct-exposure value YUV image, and outputs the Y component.

In step S13, the YUV/HSV conversion section 52 converts the correct-exposure value YUV image acquired by the image processing section 20 to a correct-exposure value HSV image. Specifically, the YUV/HSV conversion section 52 extracts the three components hue, saturation and brightness from the correct-exposure value YUV image data, and outputs these three components to serve as the correct-exposure value HSV image data.

In step S14, the color region identification section 61 of the information acquisition section 53 calculates the respective color levels of pixel units from the correct-exposure value HSV image data outputted in step S13.

In step S15, the color region identification section 61 of the information acquisition section 53 identifies color regions corresponding to respective colors on the basis of the color levels calculated in step S14.

In step S16, on the basis of the color regions identified in step S15, the color region specification section 62 of the information acquisition section 53 creates plural color maps n formed of the pixel values of the respective identified colors.

In step S17, the image adjustment section 54 adjusts the luminance values for a particular color on the basis of the information in the plural color maps n prepared in step S16, with this processing being applied to the correct-exposure value Y image data.

In step S18, the epsilon filter section 55 generates equalized image data from the adjusted Y image in which the luminance values have been adjusted, and outputs a synthesis map.

In step S19, on the basis of the synthesis map outputted in step S18, the synthesis section 56 applies pixel addition synthesis to the data of the correct-exposure value YUV image, the over-exposure value YUV image and the under-exposure value YUV image, and generates data of a composite YUV image.

In other words, the synthesis section 56 generates data of the composite YUV image by pixel addition synthesis of the data of plural images with respectively different exposure values.

To be specific, in the present embodiment, the respective data of the correct-exposure value YUV image, the over-exposure value YUV image and the under-exposure value YUV image are acquired in the processing of step S11, and the composite YUV image data is generated by pixel addition synthesis in the processing of step S19.

Figure 6:
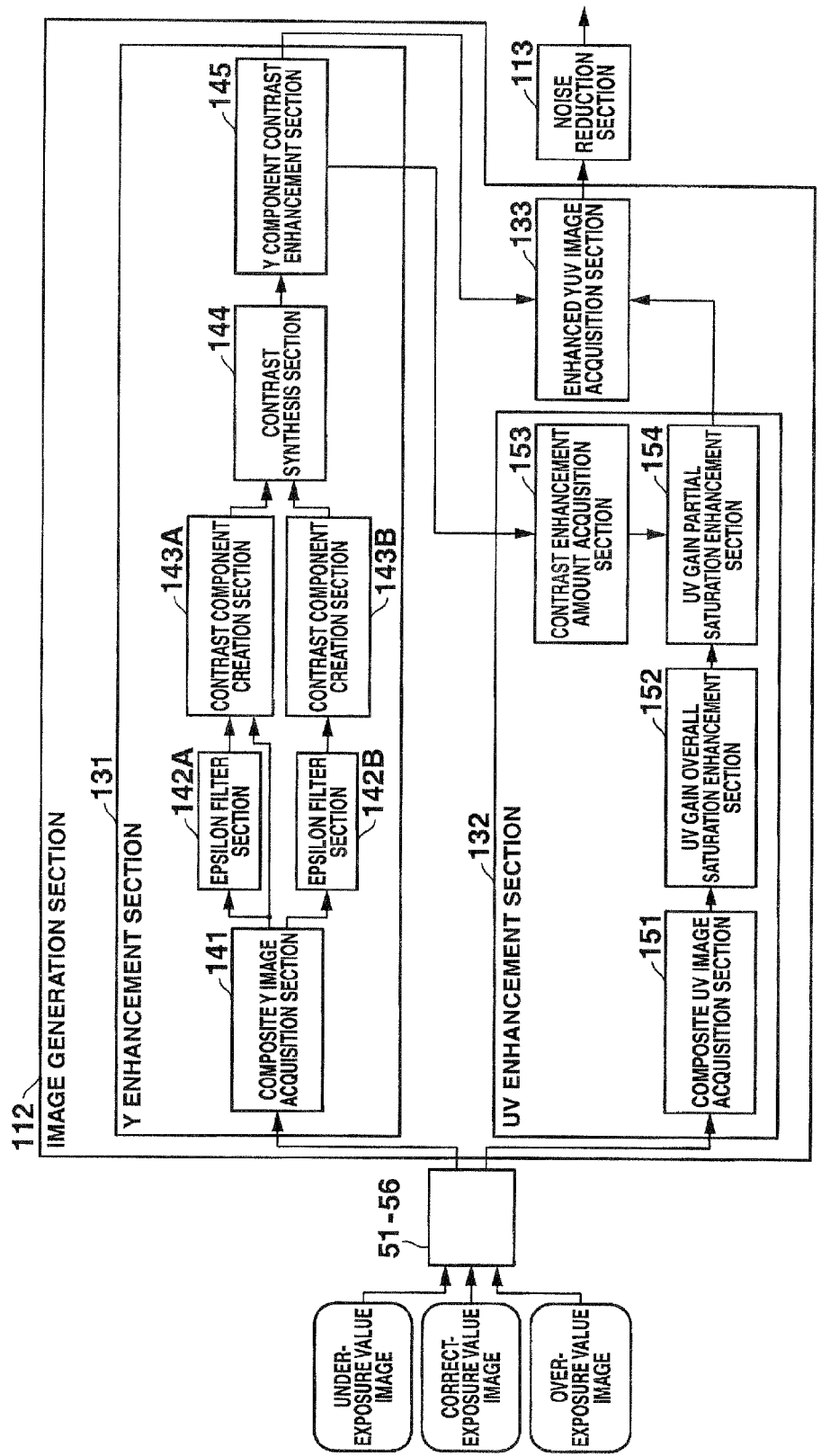
FIG. 6 is a functional block diagram illustrating, of functional structure of the image composition apparatus of FIG. 1, a functional structure for executing image treatment processing.

Next, a function for executing the image treatment processing is described using the functional block diagram in FIG. 6.

FIG. 6 is a functional block diagram illustrating, of functional structure of the image composition apparatus 1, a functional structure for implementing the image treatment processing.

The meaning of the term "image treatment processing", which is described in detail in the present embodiment, includes pixel addition synthesis of the images that are the object of processing and, after the synthesis, processing to enhance contrast and vividness (saturation).

In the composition processing described above, for the plural images acquired through the imaging section 11 and CDS/ADC 13 by successive imaging with an exposure condition being varied (the shutter speed, aperture value or gain adjustment value), the data of each of these images is separated into, of the three components defined in the YUV color space–the luminance signals (Y) representing the luminance component and the other components, specifically the color difference components that are the blue color difference signals (U) and the red color difference signals (V)–the Y component (luminance component) and UV components (color difference components). The plural separated Y components are synthesized by pixel addition, and the plural separated UV components are separately synthesized by pixel addition.

For the three components of the HDR composite image data generated by the above-described composition processing–the luminance signals (Y), the blue component color difference signals (U) and the red component color difference signals (V)-processing to enhance the contrast of the Y component and processing to enhance the saturation (vividness) of the UV components are respectively separately executed. As a result of this processing, the effect of obtaining data of an HDR composite image that is not lacking a realistic appearance even though a parameter of the color space has been greatly adjusted may be realized.

In particular, in the above processing, pixel units are enhanced using enhancement amounts that are adaptively specified for the pixel units rather than the contrast and saturation simply being uniformly enhanced over the whole of the image. Therefore, the effect is even more remarkable.

In the example in FIG. 6, the image composition apparatus 1 is equipped with the processing section including the sections from the YUV/Y conversion section 51 to the synthesis section 56 described above, and with an image generation section 112 and a noise reduction section 113.

In the present embodiment, the data of plural images with respectively different exposure conditions is, as shown in FIG. 6, the respective data of an image with a correct-exposure value (hereinafter referred to as the "correct-exposure value image"), an image with an exposure value exceeding the correct-exposure value (hereinafter referred to as the "over-exposure value image"), and an image with an exposure value below the correct-exposure value (hereinafter referred to as the "under-exposure value image"), and is processed by the YUV/Y conversion section 51 to synthesis section 56 as described above using FIG. 2.

The image generation section 112 is provided with a Y enhancement section 131 that executes the Y component enhancement processing and a UV enhancement section 132 that executes the UV component enhancement processing.

As the Y component enhancement processing, the Y enhancement section 131 enhances the contrast locally by applying unsharp mask processing with two frequency regions (for example, a low range and a medium range) to the data of the HDR composite Y image.

When the unsharp masking processes with the two frequency regions (in the example, the low range and medium range) are respectively applied, the data of the HDR composite Y image is smoothed.

A filter used for this smoothing is not particularly limited. A usual low pass filter (LPF) may be employed. However, it is excellent to employ an edge preservation-type epsilon filter, bilateral filter or the like. This is because undershooting and overshooting that occur when contrast components are locally enhanced may thus be reduced.

The sequence of processing by this Y enhancement section 131 is referred to hereinafter as the "Y component enhancement processing".

In order to execute the Y component enhancement processing, the Y enhancement section 131 is equipped with a composite Y image acquisition section 141, epsilon filter sections 142A and 142B, contrast component creation sections 143A and 143B, a contrast synthesis section 144 and a Y component contrast enhancement section 145. The functions and the like of these elements of the Y enhancement section 131 are described as appropriate in the following descriptions of the flow of the Y component enhancement processing referring to the flowchart of FIG. 7.

As the UV component enhancement processing, the UV enhancement section 132 applies processing to enhance saturation to the data of the HDR composite UV image, using a predetermined gain (hereinafter referred to as the "UV gain") as an enhancement amount.

Processes for enhancing saturation in this case are broadly divided into two categories, overall enhancement processing and partial enhancement processing.

The meaning of the term "overall enhancement processing" as used herein includes processing that enhances saturation such that the image gives a more lively overall impression.

The meaning of the term "partial enhancement processing" as used herein includes processing that enhances saturation using enhancement amounts associated with enhancement amounts for Y component enhancement processing.

Hereinafter, the enhancement amount for the Y component contrast enhancement processing is referred to as the "contrast enhancement amount", while the enhancement amount for saturation enhancement processing, which is to say the enhancement amount using the UV gain, is referred to as the "saturation enhancement amount". The saturation enhancement amounts are further broadly divided into an enhancement amount used for overall enhancement processing and enhancement amounts used for partial enhancement processing. The former is hereinafter referred to as the "overall saturation enhancement amount" and the latter are referred to hereinafter as the "partial saturation enhancement amount".

Herein, the contrast enhancement amount and the partial saturation enhancement amount are associated. As a result, the color reproduction of contrast-enhanced portions is improved, and an image producing a sense of depth may be provided.

This sequence of processing by the UV enhancement section 132 is referred to hereinafter as the "UV component enhancement processing".

In order to execute the UV component enhancement processing, the UV enhancement section 132 is equipped with a composite UV image acquisition section 151, a UV gain overall saturation enhancement section 152, a contrast enhancement amount acquisition section 153 and a UV gain partial saturation enhancement section 154. The functions and the like of these elements of the UV enhancement section 132 are described as appropriate in the following descriptions of the flow of the UV component enhancement processing referring to the flowchart of FIG. 7.

The image generation section 112 equipped with this Y enhancement section 131 and UV enhancement section 132 is also equipped with an enhanced YUV image acquisition section 133.

The enhanced YUV image acquisition section 133 acquires a combination of data of the HDR composite Y image to which the Y component enhancement processing has been applied by the Y enhancement section 131 and data of the HDR composite UV image to which the UV component enhancement processing has been applied by the UV enhancement section 132 (which combination is hereinafter referred to as the "enhanced YUV image data").

The enhanced YUV image data acquired by the enhanced YUV image acquisition section 133 is provided to the noise reduction section 113.

The noise reduction section 113 applies arbitrary processing to reduce noise (hereinafter referred to as the "noise reduction processing") to the enhanced YUV image data.

Thus, noise, tone jumps and the like produced by the enhancement processing at the image generation section 112 may be ameliorated. Here, an image with a glossy appearance may be obtained by deliberately increasing a level of the noise reduction.

Next, the image treatment processing executed by the image composition apparatus 1 in FIG. 6 with this functional structure is described with reference to the flowchart of FIG. 7.

Figure 7:
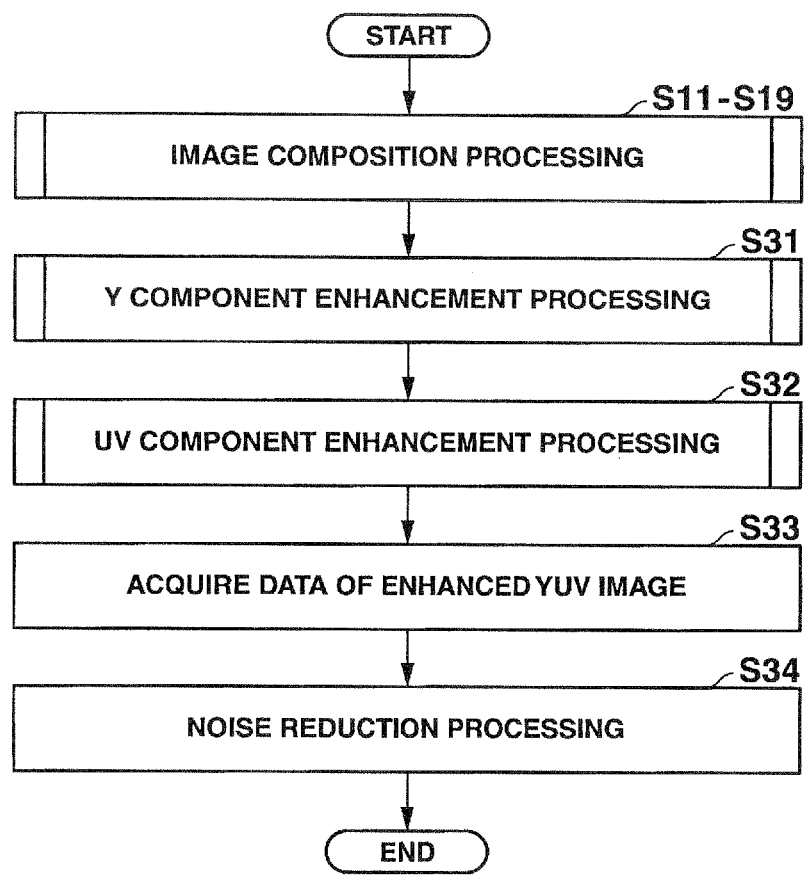
FIG. 7 is a flowchart showing an example of flow of the image treatment processing that is executed by the image processing section of the image composition apparatus of FIG. 2.

FIG. 7 is a flowchart showing an example of flow of the image treatment processing.

In step S31, the Y enhancement section 131 of the image generation section 112 applies the Y component enhancement processing to, of the HDR composite image data generated in the processing of FIG. 5 by the YUV/Y conversion section 51 to synthesis section 56, the HDR composite Y image data.

In step S32, the UV enhancement section 132 of the image generation section 112 applies the UV component enhancement processing to, of the HDR composite image data generated in the processing of FIG. 5 by the YUV/Y conversion section 51 to synthesis section 56, the HDR composite UV image data.

Details of the Y component enhancement processing of step S31 are described below with reference to the flowchart of FIG. 8 and, separately, details of the UV component enhancement processing of step S32 are described below with reference to the flowchart of FIG. 9.

In step S33, the enhanced YUV image acquisition section 133 acquires the combination of the HDR composite Y image data to which the Y component enhancement processing has been applied in step S31 and the HDR composite UV image data to which the UV component enhancement processing has been applied in step S32, to serve as the enhanced YUV image data.

In step S34, the noise reduction section 113 applies the noise reduction processing to the enhanced YUV image data acquired in the processing of step S33.

The enhanced YUV image data to which the noise reduction processing has been applied is outputted to the exterior from the noise reduction section 113, and the image treatment processing ends.

Next, from this image treatment processing, respective details of the Y component enhancement processing of step S31 and the UV component enhancement processing of step S32 are separately described in this order.

First, details of the Y component enhancement processing of step S31 are described with reference to the flowchart of FIG. 8.

Figure 8:
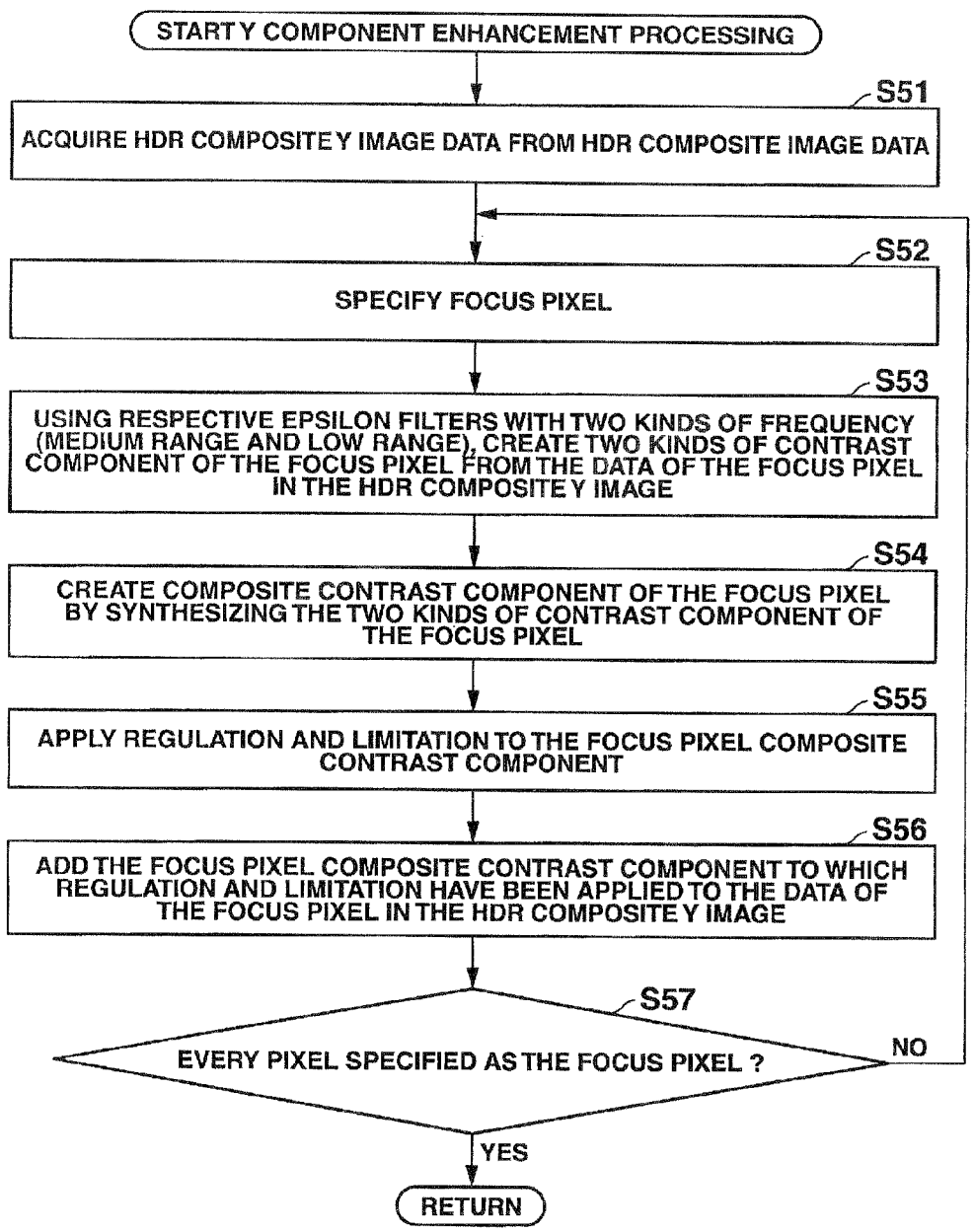
FIG. 8 is a flowchart showing an example of flow of Y component enhancement processing that is executed by an enhanced image generation section of the image composition apparatus of FIG. 6.

FIG. 8 is a flowchart showing an example of flow of the Y component enhancement processing.

In step S51, the composite Y image acquisition section 141 of the Y enhancement section 131 of FIG. 6 acquires, of the HDR composite image data outputted from the synthesis section 56, the HDR composite Y image data.

In step S52, the Y enhancement section 131 specifies a pixel disposed at a predetermined position (co-ordinate) among the respective pixels constituting the HDR composite Y image as being a pixel to be focused on as an object of processing (hereinafter referred to as the "focus pixel").

Data (pixel values) of the focus pixel of the HDR composite Y image is provided to each of the epsilon filter sections 142A and 142B and the contrast component creation sections 143A and 143B, and the processing advances to step S53.

In step S53, the epsilon filter sections 142A and 142B and the contrast component creation sections 143A and 143B use respective epsilon filters with two kinds of frequency (the medium range and the low range) to create two kinds of contrast component of the focus pixel in the HDR composite Y image from the data (pixel values) of the focus pixel.

In the present embodiment, one of the two kinds of contrast component is generated using a medium-range emphasizing epsilon filter with a small filter size. The contrast component of this kind is hereinafter referred to as the "medium range contrast component".

The other of the two kinds of contrast component is generated using a low-range emphasizing epsilon filter with a large filter size. The contrast component of this kind is hereinafter referred to as the "low range contrast component".

In the present embodiment, the medium range contrast component is generated by the following sequence of processing being executed by the epsilon filter section 142A and the contrast component creation section 143A.

The epsilon filter section 142A applies the medium-range emphasizing epsilon filter to the data of the focus pixel in the HDR composite Y image, and data produced as a result thereof (hereinafter referred to as the "epsilon-filtered data") is provided to the contrast component creation section 143A.

The contrast component creation section 143A creates the medium range contrast component of the focus pixel by finding a difference between the data of the focus pixel in the HDR composite Y image and the epsilon-filtered data of the focus pixel. That is, the medium range contrast component of the focus pixel is created by calculation of the following expression (2).

$$Y\_contrast\_1 = Y\_HDR - Y\_epsilon\_1 \quad (2)$$

In expression (2), Y_contrast_1 represents the medium range contrast component of the focus pixel, Y_HDR represents the data (pixel value) of the focus pixel in the HDR composite Y image, and Y_epsilon_1 represents the epsilon-filtered data of the focus pixel that is generated using the medium range epsilon filter.

Meanwhile, in the present embodiment, the low range contrast component is generated by the following sequence of processing being executed by the epsilon filter section 142B and the contrast component creation section 143B.

The epsilon filter section 142B applies the low-range emphasizing epsilon filter to the data of the focus pixel in the HDR composite Y image, and epsilon-filtered data produced as a result thereof is provided to the contrast component creation section 143B.

The contrast component creation section 143B creates the low range contrast component of the focus pixel by finding a difference between the data of the focus pixel in the HDR composite Y image and the epsilon-filtered data of the focus pixel. That is, the low range contrast component of the focus pixel is created by calculation of the following expression (3).

$$Y\_contrast\_2 = Y\_HDR - Y\_epsilon\_2 \quad (3)$$

In expression (3), Y_contrast_2 represents the low range contrast component of the focus pixel, Y_HDR Represents the data (pixel value) of the focus pixel in the HDR composite Y image, the same as in expression (2), and Y_epsilon_2 represents the epsilon-filtered data of the focus pixel that is generated using the low range epsilon filter.

The two kinds of contrast component of the focus pixel generated in this manner, that is, the medium range contrast component of the focus pixel generated by the contrast component creation section 143A and the low range contrast component of the focus pixel generated by the contrast component creation section 143B, are provided to the contrast synthesis section 144, and the processing advances to step S54.

In step S54, the contrast synthesis section 144 creates a composite contrast component of the focus pixel by pixel addition synthesis of the two kinds of contrast component of the focus pixel, that is, the medium range contrast component and low range contrast component of the focus pixel.

That is, the composite contrast component of the focus pixel is created by calculation of the following expression (4).

$$Y\_contrast = Y\_contrast\_1 + Y\_contrast\_2 \quad (4)$$

In expression (4), Y_contrast represents the composite contrast component of the focus pixel, Y_contrast_1 represents the medium range contrast component of the focus pixel calculated by the above-mentioned expression (2), and Y_contrast_2 represents the low range contrast component of the focus pixel calculated by the above-mentioned expression (3).

The focus pixel composite contrast component generated in this manner by the contrast synthesis section 144 is provided to the Y component contrast enhancement section 145, and the processing advances to step S55.

In step S55, the Y component contrast enhancement section 145 applies regulation and limitation to the focus pixel composite contrast component.

Specifically, in the present embodiment, regulation is applied to the focus pixel composite contrast component in accordance with the following expression (5).

$$Y\_contrast = Y\_contrast \times (Y\_gain\_lev/100) \times (Y\_adj\_lev/100) \quad (5)$$

In expression (5), Y_contrast at the left side represents the focus pixel composite contrast component after the regulation, while Y_contrast at the right side represents the focus pixel composite contrast component before the regulation.

Also in expression (5), Y_gain_lev represents a level of gain (%) that is uniformly specified for all data of the HDR composite Y image (hereinafter referred to as the "Y gain"), and Y_adj_lev represents the level of an adjustment amount (%) that is individually specified for the data of the focus pixel in the HDR composite Y image (hereinafter referred to as the "Y adjustment level").

Further, in the present embodiment, limitation is applied to the focus pixel composite contrast component in accordance with the following expression (6) if the focus pixel composite contrast component is less than zero (If(Y_contrast>0), and in accordance with the following expression (7) otherwise (Else).

$$Y\_contrast = f_{Min}(Y\_contrast, Y\_contrast\_max\_lev) \quad (6)$$

$$Y\_contrast = f_{Max}(Y\_contrast, |Y\_contrast\_max\_lev|) \quad (7)$$

In expression (6) and expression (7), Y_contrast at the left side represents the focus pixel composite contrast component after the limitation, while Y_contrast at the right side represents the focus pixel composite contrast component before the limitation.

Also in expression (6) and expression (7), Y_contrast_max_lev represents the level of an upper limit specified in advance for the composite contrast components. In expression (6), $f_{Min}$(alpha,beta) represents a function that outputs the greater of alpha and beta, and in expression (7), $f_{Max}$(alpha,beta) represents a function that outputs the greater of alpha and beta.

Then, in step S56, the Y component contrast enhancement section 145 adds the focus pixel composite contrast component to which regulation and limitation have been applied in the processing of step S55 to the data of the focus pixel in the HDR composite Y image.

Thus, the contrast of the data of the focus pixel in the HDR composite Y image is enhanced by the amount of the composite contrast component of the focus pixel to which regulation and limitation have been applied by the processing of step S55.

To be specific, the contrast of the data of the focus pixel in the HDR composite Y image is enhanced by calculation of the following expression (8).

$$Y\_result = Y\_HDR + Y\_contrast \quad (8)$$

In expression (8), Y_result represents the data of the focus pixel after the contrast enhancement (a pixel value of the focus pixel after the contrast enhancement), Y_HDR represents the data of the focus pixel before the contrast enhancement (the pixel value of the focus pixel before the contrast enhancement), and Y_contrast represents the contrast adjustment amount, which is the focus pixel composite contrast component after regulation has been applied in accordance with expression (5) and limitation has been applied in accordance with expression (6) or expression (7).

In step S57, the Y enhancement section 131 determines whether or not every pixel has been specified as the focus pixel.

If there are any pixels among the pixels constituting the HDR composite Y image that have not yet been specified as the focus pixel, the result of the determination in step S57 is "No", the processing returns to step S52, and the subsequent processing is repeated.

That is, the respective pixels constituting the HDR composite Y image are sequentially specified as the focus pixel, and the processing loop from step S52 to step S57 is repeatedly executed, updating the data of the pixels specified as the focus pixel so that the contrast is enhanced. Here, the degree of enhancement of the contrast is adaptively variable in accordance with the values of Y HDR in the data before the updating of the pixels specified as the focus pixel.

Then, when the final pixel is specified as the focus pixel by the processing of step S52 and the processing of steps S53 to S56 is executed, all the pixels constituting the HDR composite Y image have been updated (the pixel values of all the pixels have been updated to the value Y_result in the above-mentioned expression (8)). In the next determination in step S57, the result is "Yes", and the Y component enhancement processing ends.

Thus, of the image treatment processing in FIG. 7, the Y component enhancement processing of step S31 ends, and the UV component enhancement processing of step S32 is executed.

Herebelow, details of the UV component enhancement processing of step S32 are described with reference to the flowchart of FIG. 9.

Figure 9:
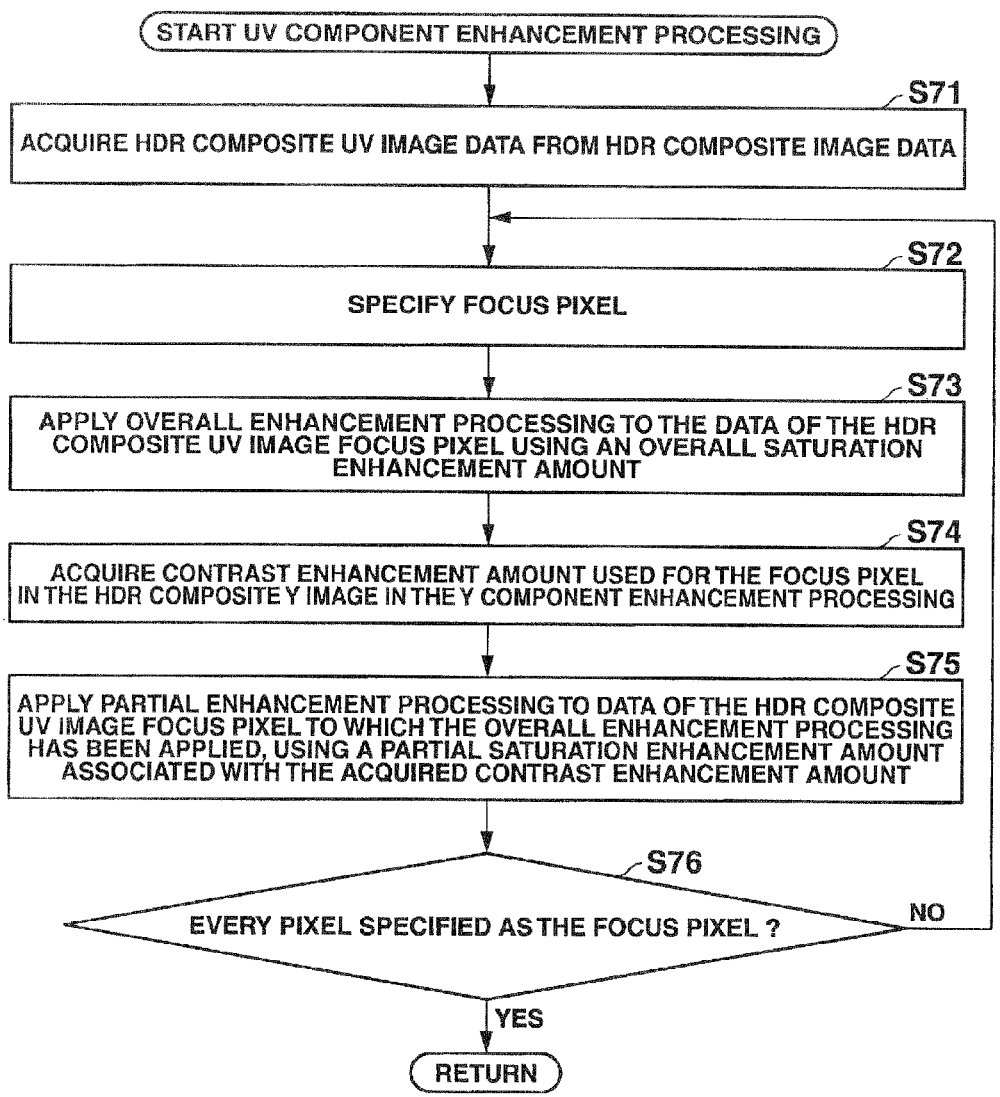
FIG. 9 is a flowchart showing an example of flow of UV component enhancement processing that is executed by the enhanced image generation section of the image composition apparatus of FIG. 6.

FIG. 9 is a flowchart showing an example of flow of the UV component enhancement processing.

In step S71, the composite UV image acquisition section 151 of the UV enhancement section 132 of FIG. 6 acquires, of the HDR composite image data outputted from the synthesis section 56, the HDR composite UV image data.

In step S72, the UV enhancement section 132 specifies a pixel disposed at a predetermined position (co-ordinate) among the respective pixels constituting the HDR composite UV image as a focus pixel. In the present embodiment, the UV enhancement section 132 performs execution non-synchronously with the Y enhancement section 131 (but may perform execution synchronously, as is described below). Where appropriate in the descriptions, a pixel in the HDR composite Y image that is disposed at the same position (co-ordinate) as the focus pixel in the HDR composite UV image is referred to as the "HDR composite Y image focus pixel". That is, the following descriptions are given with an HDR composite UV image focus pixel and an HDR composite Y image focus pixel being respectively corresponding pixels at the same position (co-ordinate).

In step S73, the UV gain overall saturation enhancement section 152 applies overall enhancement processing to the data of the HDR composite UV image focus pixel using an overall saturation enhancement amount.

Specifically in the present embodiment, overall enhancement processing is applied to the data of the HDR composite UV image focus pixel by calculation of the following expression (9) and expression (10).

$$U\_HDR' = U\_HDR \times UV\_gain\_lev\_al/100 \quad (9)$$

$$V\_HDR' = V\_HDR \times UV\_gain\_lev\_al/100 \quad (10)$$

In expression (9), U_HDR' represents the U component value of the HDR composite UV image focus pixel after the overall enhancement processing has been applied, and U_HDR represents the U component value of the HDR composite UV image focus pixel before the overall enhancement processing is applied.

In expression (10), V_HDR' represents the V component value of the HDR composite UV image focus pixel after the overall enhancement processing has been applied, and V_HDR represents the V component value of the HDR composite UV image focus pixel before the overall enhancement processing is applied.

In expression (9) and expression (10), UV_gain_lev_al represents an overall UV gain (%), which is an overall saturation enhancement amount that is uniformly specified for the whole of the HDR composite UV image.

In step S74, the contrast enhancement amount acquisition section 153 acquires the contrast enhancement amount used in the Y component enhancement processing for the focus pixel in the HDR composite Y image.

Specifically, the following expression (11) is computed and the contrast enhancement amount is acquired.

$$Y\_emphasis\_Lev = |Y\_contrast| \quad (11)$$

In expression (11), Y_emphasis_Lev at the left side represents the acquired contrast enhancement amount. Y_contrast at the right side is the composite contrast component of the focus pixel after the regulation in accordance with the above-mentioned expression (5) and limitation in accordance with expression (6) or expression (7) have been applied, which is the correction amount applied to the data of the focus pixel before contrast enhancement (pixel value Y_HDR) in the above-mentioned expression (8).

In step S74, the UV gain partial saturation enhancement section 154 applies partial enhancement processing to the data of the HDR composite UV image focus pixel to which the overall enhancement processing has been applied by the processing of step S72, using a partial saturation enhancement amount associated with the contrast enhancement amount acquired by the processing of step S73.

Specifically in the present embodiment, the partial enhancement processing is applied to the U component value of the focus pixel in the HDR composite UV image to which the overall enhancement processing has been applied, by calculation of the following expression (12).

$$U\_result = U\_HDR' + U\_HDR \times (UV\_gain\_lev\_part \times Y\_emphasis\_lev/Y\_contrast\_max\_lev)/100 \times UV\_adj\_lev/100 \quad (12)$$

In expression (12), U_result at the left side represents the U component value of the HDR composite UV image focus pixel to which the overall enhancement processing and the partial enhancement processing have been applied, and U_HDR' at the right side represents the U component value of the HDR composite UV image focus pixel to which the overall enhancement processing has been applied in accordance with the above-mentioned expression (9).

UV_gain_lev_part represents a UV partial gain (%). Y_emphasis_lev represents the contrast enhancement amount acquired by the above-mentioned expression (11), that is, the contrast enhancement amount used when the Y component enhancement processing was applied to the data of the focus pixel in the composite Y image. Y_contrast_max_lev represents a maximum level specified in advance for the composite contrast component.

In other words, (UV_gain_lev_part×Y_emphasis_lev/Y_contrast_max_lev)/100 represents the partial saturation enhancement amount (%) associated with the contrast enhancement amount.

UV_adj_lev represents the level of an enhancement amount (%) that is separately specified for the data of the focus pixel of the HDR composite UV image (hereinafter referred to as the "UV enhancement amount").

In addition, in the present embodiment the partial enhancement processing is applied to the V component value of the HDR composite UV image focus pixel to which the overall enhancement processing has been applied, by calculation of the following expression (13).

$$V\_result = V\_HDR' + V\_HDR \times (UV\_gain\_lev\_part \times Y\_emphasis\_lev/Y\_contrast\_max\_lev)/100 \times UV\_adj\_lev/100 \quad (13)$$

In expression (13), V_result at the left side represents the V component value of the HDR composite UV image focus pixel to which the overall enhancement processing and the partial enhancement processing have been applied, and V_HDR' at the right side represents the V component value of the HDR composite UV image focus pixel to which the overall enhancement processing has been applied in accordance with the above-mentioned expression (10).

In expression (13), the same as in expression (12), (UV_gain_lev_part×Y_emphasis_lev/Y_contrast_max_lev)/100 is used as the partial saturation enhancement amount (%) associated with the contrast enhancement amount.

In step S76, the UV enhancement section 132 determines whether or not every pixel has been specified as the focus pixel.

If there are any pixels among the pixels constituting the HDR composite UV image that have not yet been specified as the focus pixel, the result of the determination in step S76 is "No", the processing returns to step S72, and the subsequent processing is repeated.

That is, the respective pixels constituting the HDR composite UV image are sequentially specified as the focus pixel, and the processing loop from step S72 to step S76 is repeatedly executed, updating the data of the pixels specified as the focus pixel so that the saturation is enhanced. Here, the degree of enhancement of the saturation is adaptively variable in accordance with the values of U_HDR and V_HDR in the data before the updating of the pixels specified as the focus pixel.

Then, when the final pixel is specified as the focus pixel by the processing of step S72 and the processing of steps S73 to S76 is executed, all the pixels constituting the HDR composite UV image have been updated (the pixel values of all the pixels have been updated to the value U_result in the above-mentioned expression (12) and the value V_result in the above-mentioned expression (13)). In the next determination in step S76, the result of the determination is "Yes", and the UV component enhancement processing ends.

Thus, of the image treatment processing in FIG. 7, the UV component enhancement processing of step S32 ends, and the processing advances to step S33. The combination of data of the HDR composite Y image to which the Y component enhancement processing of step S31 has been applied and data of the HDR composite UV image to which the UV component enhancement processing of step S32 has been applied is acquired by the enhanced YUV image acquisition section 133 to serve as data of an enhanced YUV image.

Note that the flow of the image treatment processing described above is merely an example.

For example, in the above example, the UV component enhancement processing of step S32 is executed after the Y component enhancement processing of step S31, but the order of these processes is not particularly limited. However, for the UV component enhancement processing of step S32, it is necessary to be able to acquire the contrast enhancement amount used in the Y component enhancement processing of step S31 (the contrast enhancement amount Y_emphasis_lev in expression (11)).

As described hereabove, when the HDR composite image data is separated into the HDR composite Y image data formed of Y components and the HDR composite UV image data formed of U and V components, the Y enhancement section 131 of FIG. 6 enhances the HDR composite Y image data using predetermined contrast enhancement amounts, while the UV enhancement section 132 enhances the HDR composite UV image data using saturation enhancement amounts that are variable in association with the contrast enhancement amounts of the Y enhancement section 131.

Thus, an effect may be realized of obtaining HDR composite image data such that a realistic appearance is not lost even if a parameter of the color space is greatly adjusted.

In particular, because the Y enhancement section 131 adjusts the data of pixels at predetermined positions (co-ordinates) in the HDR composite Y image using contrast enhancement amounts that differ between the respective positions, and the UV enhancement section 132 adjusts the data of the pixels at the predetermined positions (co-ordinates) in the HDR composite UV image using saturation enhancement amounts that are variable in association with the contrast enhancement amounts for the same positions in the HDR composite Y image, the effect is remarkable.

The image composition apparatus of the present embodiment that is constituted as described above is equipped with the information acquisition section 53, the image adjustment section 54 and the synthesis section 56.

The information acquisition section 53 acquires numerical values relating to brightness of image regions with a particular color in one set of image data among plural sets of image data that are sequentially captured with the exposure duration being varied.

The image adjustment section 54 adjusts the numerical values acquired by the information acquisition section 53.

The synthesis section 56 adjusts the brightness of the pixel regions with the particular color in the image data with the numerical values adjusted by the image adjustment section 54, synthesizes the adjusted image data with the other image data of the data of the plural images, and generates composite image data with a widened dynamic range.

Thus, the numerical values relating to brightness are adjusted for pixel regions with the particular color, the image with the adjusted numerical values and the other images are synthesized, and the image whose dynamic range is widened is generated. That is, there are cases in which colors of a particular color should be preserved in a natural state even if a parameter of the color space is greatly adjusted. In such a case, if the parameter is adjusted for all colors, natural hues of objects with the particular color might be lost. Thus, by adjusting the numerical values relating to brightness for the particular color, a parameter in the color space may be greatly adjusted and an image may still be generated such that a realistic appearance is not lacking. Moreover, even if a parameter of the color space is excessively adjusted, an image with natural tones may be generated.

The image adjustment section 54 of the image composition apparatus 1 of the present embodiment performs adjustment by incrementing or decrementing the numerical values acquired by the information acquisition section 53 by a pre-specified value.

Thus, the pixel regions with the particular color are incremented or decremented by a pre-specified numerical value relating to brightness. Accordingly, the numerical value relating to brightness is specified in advance for objects with the particular color that should retain a natural feeling. Hence, even if a parameter is greatly adjusted, an image with natural tones may be generated.

The image composition apparatus 1 of the present embodiment is further equipped with the YUV/HSV conversion section 52. The YUV/HSV conversion section 52 converts the data of the one image (the correct-exposure value YUV image data) to image data in a color space with a parameter relating to hue (the correct-exposure value HSV image data). The information acquisition section 53 specifies pixel regions included in the image data converted by the YUV/HSV conversion section 52 that appear with a particular hue. Then, the information acquisition section 53 acquires numerical values relating to the brightness of the pixel regions with the particular color (which is, for example, green).

Thus, the saturations and brightness of respective hues may be identified by expressing the image expressed in the YUV color space in the HSV color space instead, and the numerical values relating to brightness of a particular hue, that is, luminance values, may be easily acquired. Therefore, because numerical values relating to brightness of the particular color that should retain a natural feeling are easily acquired, an image with natural tones may be easily generated.

The particular color that is acquired in the image composition apparatus 1 of the present embodiment is a color included in plants and other organisms belonging to the natural world.

Colors whose natural states should be preserved may be the greens of plant leaves, the skin colors of human skin and the like, specifically organic materials and the like. Therefore, an image made be generated with natural tones, especially of a particular color of objects that belong to the natural world, even if a parameter is greatly adjusted.

In the image composition apparatus 1 of the present embodiment, if the images captured sequentially with the exposure duration being varied are odd in number, the data of the one image is the data of the image among the sequentially captured images that was captured with the middle exposure.

Thus, when there is a plural number of images with different exposure durations, because the image data captured with the middle exposure is used, the numerical values relating to brightness may be adjusted on the basis of an image with average exposure conditions. Thus, adjustment of the numerical values relating to brightness on the basis of image data whose exposure value is off-centered may be avoided.

In the image composition apparatus 1 of the present embodiment, if the images that are captured sequentially with the exposure duration being varied are even in number, then if the data of the one image is data of an image that is relatively bright among the sequentially captured images, data is obtained in which this image data is adjusted so as to be darkened. If the data of the one image is data of an image that is relatively dark among the sequentially captured images, data is obtained in which this image data is adjusted so as to be brightened.

Thus, when there is an even number of images captured sequentially with the exposure duration being varied, the numerical values relating to brightness of an image are adjusted such that the exposure conditions are average exposure conditions. Thus, adjustment of the numerical values relating to brightness on the basis of image data whose exposure value is off-centered may be avoided.

Furthermore, the image composition apparatus 1 of the present embodiment is equipped with the Y enhancement section 131 and the UV enhancement section 132.

When the composite image data generated by the synthesis section 56 is separated into composite Y image data formed of luminance components and composite UV image data formed of other components, which are defined in the predetermined color space, the Y enhancement section 131 adjusts the composite Y image data using predetermined first enhancement amounts.

The UV enhancement section 132 enhances the composite UV image data using second enhancement amounts, which are variable in association with the first enhancement amounts of the Y enhancement section 131.

Thus, because the numerical values relating to brightness are adjusted for the particular color, an image may be generated from the adjusted image such that a realistic appearance is not lacking even though a parameter of the color space is greatly adjusted. Moreover, even if a parameter of the color space is excessively adjusted, an image with natural tones may be generated.

The present invention is not limited by the above embodiment. Modifications, improvements and the like within a scope in which the objective of the invention may be achieved are to be encompassed by the present invention.

For example, the color region specification section 62 creates the plural color maps n of the respective pixel values of all the colors that are identified by the color region identification section 61. However, the color region specification section 62 is not limited thus. For example, just a color map of pixel values relating to a particular color (for example, green) may be created.

Further, in the present embodiment, the color region specification section 62 provides the plural color maps n created for the respective colors to the image adjustment section 54, but is not limited thus. That is, just the color map relating to a particular color (for example, green) may be provided to the image adjustment section 54.

As a further example, the color region identification section 61 calculates the color levels for the respective pixel units on the basis of the correct-exposure value HSV image, but is not limited thus. For example, if composition is performed on the basis of two images, an under-exposure HSV value image converted from an under-exposure value YUV image and an over-exposure HSV value image converted from an over-exposure value YUV image, the color region identification section 61 may calculate the color levels of the respective pixel units from data of a simulated correct-exposure value HSV image in which the under-exposure value HSV image and the over-exposure value HSV image are averaged.

As a further example, the color region specification section 62 calculates the color levels of the respective pixel units on the basis of-from the under-exposure value YUV image, correct-exposure value YUV image and over-exposure value YUV image sequentially captured with the exposure duration being varied-a correct-exposure value HSV image converted from the correct-exposure value YUV image, but the color region specification section 62 is not limited thus. For example, if the images sequentially captured with the exposure duration being varied are odd in number, the color levels for the respective pixel units may be calculated on the basis of an HSV image converted from the YUV image that was captured in the middle of the sequentially captured images. Alternatively, if the images sequentially captured with the exposure duration being varied are even in number, the color levels for the respective pixel units may be calculated on the basis of an HSV image converted from a YUV image that is a brighter image among the sequentially captured images, the YUV image having been adjusted so as to be darker, or a darker image among the sequentially captured images, the YUV image having been adjusted so as to be brighter.

As a further example, the information acquisition section 53 acquires information on luminance values of pixel regions with a particular color in the correct-exposure value YUV image data, but is not limited thus. For example, the information acquisition section 53 may acquire information on saturations of pixel regions with a particular color in the correct-exposure value YUV image data.

As a further example, in the embodiment described above, an epsilon filter is employed as the filter that is used for smoothing when applying the unsharp mask processing in the Y component enhancement processing by the Y enhancement section 131.

However, this filter is not particularly limited to the epsilon filter as above. For example, if an image that deliberately features undershooting and overshooting produced when the contrast component is locally enhanced should be generated, a usual low pass filter may be employed.

As a further example, in the embodiment described above, two kinds of frequency (a low range and a medium range) are employed in the Y component enhancement processing for enhancing the contrast, but this is not particularly limiting and three or more kinds may be used. For example, in addition to a low range and a medium range, a high range may be employed. Thus, by enhancing the high range, sharpness may be improved.

In the embodiment described above, a case in which a face image region is present in the image that is the object of the partial enhancement processing is not considered. However, a face image region may be detected using a publicly known face image region recognition technology and, taking account of the presence of a detected face image, the partial enhancement processing may be controlled to have smaller enhancement amounts. Accordingly, the problem of losing the hues, appearance and the like of a face (particularly skin-color regions) through excessive enhancement may be overcome.

More specifically, contrast enhancement amounts that are employed for the Y image and saturation enhancement amounts that are employed for the U and V images when a face image region is detected may be specified in advance. These enhancement amounts may be suppressed to be smaller than the contrast enhancement amounts and saturation enhancement amounts described hereabove, specifically around 80% thereof.

If a face image region is detected, an image that is partial enhancement-processed with the contrast enhancement amounts and saturation enhancement amounts in the above-described steps S33 to S34 and an image that is partial enhancement-processed with the contrast enhancement amounts and saturation enhancement amounts that are employed when a face image region is detected are generated, and a composite image is obtained from these images by alpha blending of pixel units.

In this case, the face image region and edge regions thereof are synthesized such that the proportion for the image that is partial enhancement-processed with the contrast enhancement amounts and saturation enhancement amounts that are employed when a face image region is detected is higher, and other regions may be synthesized such that the proportion for the image processed for that is partial enhancement-processed with the contrast enhancement amounts and saturation enhancement amounts in the above-described steps S33 to S34 is higher.

As a further example, in the embodiment described above, the data of three images, which is the data of the plural images with respectively different exposure values, is synthesized by pixel addition. However, the number of images whose data is subject to synthesis is not particularly limited. That is, the present invention may be broadly applied to cases in which data of an arbitrary number of images, which number is at least two, is synthesized by pixel addition.

The data of the various images subject to the image composition processing is not particularly limited to the specific example illustrated in the drawings described above. For example, the specification of exposure values when data of plural images that are to be synthesized are captured is not limited to the specific example illustrated in the above-described drawings but may be arbitrary provided the respective exposure values are different.

Although not specifically mentioned in the above embodiment, it is excellent if mispositioning of the data of the plural images with respectively different exposure values is corrected in advance, in consideration of the pixel addition synthesis The image composition apparatus of the present invention may be applied to common electronic devices that are capable of executing the image processing described above. As specific examples, the present invention may be applied to personal computers, smartphones, printers, television sets, video cameras, portable navigation devices, portable telephones, portable video game machines and so forth.

The processing sequence described above can be executed by hardware, and also can be executed by software.

That is, the functional structure in FIG. 2 is merely an example and is not particularly limiting. In other words, it is sufficient that a function capable of executing the whole of the above-described sequence of processing is provided at the image composition apparatus 1; the kinds of functional blocks to be used for executing this function are not particularly limited by the example in FIG. 2.

A single functional block may be configured by a single piece of hardware, a single installation of software, or any combination thereof.

In a case in which the processing sequence is to be executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

As well as the removable medium 41 in FIG. 1 that is distributed separately from the main body of the equipment for supplying the program to users, a storage medium containing such a program may be constituted by a storage medium that is supplied to users in a state of being incorporated in the main body of the equipment in advance. The removable medium 41 is constituted by, for example, a magnetic disc (such as a floppy disk), an optical disc, a magneto-optical disc or the like. The optical disk is composed of, for example, a CD-ROM (Compact Disc Read-Only Memory), a DVD (Digital Versatile Disc) or the like. The magneto-optical disk is composed of an MD (Mini-Disk) or the like. The storage medium supplied to the user in a state of being incorporated in the device main body in advance may include, for example, the program memory 17 of FIG. 1, a hard disk (not shown in the drawings) or the like in which the program is recorded.

It should be noted that, in the present specification, the steps describing the program recorded in the storage medium include not only the processing executed in a time series following this order, but also processing executed in parallel or individually, which is not necessarily executed in a time series.

Moreover, the term "system" as used in the present specification is intended to include the whole of equipment constituted by plural devices, plural units and the like.

A number of embodiments of the present invention are explained hereabove. These embodiments are merely examples and do not limit the technical scope of the invention. The present invention may be attained by numerous other embodiments, and numerous modifications such as omissions, substitutions and the like are possible within a technical scope not departing from the spirit of the invention. These embodiments and modifications are to be encompassed by the scope and gist of the invention recited in the present specification, etc., and are encompassed by the inventions recited in the attached claims and their equivalents.

What is claimed is:
1. An image composition apparatus comprising:
an information acquisition unit that acquires numerical values relating to brightness of pixel regions with a particular color in data of any image among data of a plurality of images that are sequentially captured with an exposure duration being varied;

a synthesis unit that performs pixel addition of the data of the plurality of images by changing a degree of addition of the data of the plurality of images, based on the numerical values acquired by the information acquisition unit, and generates data of a composite image whose dynamic range is widened; and a conversion unit that converts the data of the any image to image data in a color space that includes a parameter relating to hue;

wherein the information acquisition unit identifies pixel regions included in the image data converted by the conversion unit that are expressed with a particular hue, and acquires numerical values relating to the brightness of pixel regions with the Particular color.

2. The image composition apparatus according to claim 1, further comprising an adjustment unit that adjusts the numerical values acquired by the information acquisition unit by incrementing or decrementing the numerical values by a pre-specified value, wherein the synthesis unit performs pixel addition of the data of the plurality of images by changing a degree of addition of the data of the plurality of images, based on the numerical values adjusted by the adjustment unit.

3. The image composition apparatus according to claim 1, further comprising a synthesis map generation unit that generates a synthesis map, in which a synthesis ratio is set for performing pixel addition of the data of the plurality of images based on the numerical values, wherein the synthesis unit performs pixel addition of the data of the plurality of images, based on the synthesis map generated by the synthesis map generation unit.

4. The image composition apparatus according to claim 1, wherein the particular color is a color included in plants and organisms that are present in the natural world.

5. The image composition apparatus according to claim 1, further comprising a corrected exposure image generation unit that generates the corrected exposure image, by performing adjustment such that data of an image being relatively bright among the sequentially captured images is darkened, or by performing adjustment such that data of an image being relatively dark among the sequentially captured images is brightened, if the corrected exposure image is not present among the images sequentially captured with the exposure duration being varied, in which the any image is an image acquired at corrected exposure.

6. The image composition apparatus according to claim 1, further comprising:

a first enhancement unit that, when the composite image data generated by the synthesis unit is separated into first image data formed of a luminance component defined in a predetermined color space and second image data formed of other components, enhances the first image data using a predetermined first enhancement amount; and a second enhancement unit that enhances the second image data using a second enhancement amount that is variable in association with the first enhancement amount of the first enhancement unit.

7. A non-transitory computer readable storage medium having stored therein a program executable by a computer that controls an image composition apparatus that generates composite image data, said program controlling the computer to execute image composition processing comprising:

an information acquisition function that acquires numerical values relating to brightness of pixel regions with a particular color in data of any image among data of a plurality of images that are sequentially captured with an exposure duration being varied;

a synthesis function that performs pixel addition of the data of the plurality of images by changing a degree of addition of the data of the plurality of images, based on the numerical values acquired by the information acquisition function, and generates data of a composite image whose dynamic range is widened; and a conversion function that converts the data of the any image to image data in a color space that includes a parameter relating to hue, wherein the information acquisition function identifies pixel regions included in the image data converted by the conversion function that are expressed with a particular hue, and acquires numerical values relating to the brightness of pixel regions with the particular color.

8. An image composition method comprising:

an information acquisition step of acquiring numerical values relating to brightness of pixel regions with a particular color in data of any image among data of a plurality of images that are sequentially captured by an image capturing unit with an exposure duration being varied;

a synthesis step of performing pixel addition of the data of the plurality of images by changing a degree of addition of the data of the plurality of images, based on the numerical values acquired in the information acquisition step, and generating data of a composite image whose dynamic range is widened; and a conversion step that converts the data of the any image to image data in a color space that includes a parameter relating to hue, wherein the information acquisition step identifies pixel regions included in the image data converted by the conversion step that are expressed with a particular hue, and acquires numerical values relating to the brightness of pixel regions with the particular color.

* * * * *